United States Patent [19]
Valentaten et al.

[11] Patent Number: 5,250,940
[45] Date of Patent: Oct. 5, 1993

[54] MULTI-MODE HOME TERMINAL SYSTEM THAT UTILIZES A SINGLE EMBEDDED GENERAL PURPOSE/DSP PROCESSOR AND A SINGLE RANDOM ACCESS MEMORY

[75] Inventors: Maurice Valentaten, Geltendorf; Bernd Moeschen, Starnberg, both of Fed. Rep. of Germany; Yehezkel Friedman, Tel-Aviv, Israel; Yom-Tov Sidi, Nes-Ziona, Israel; Zeev Bikowsky, Natania, Israel; Zohar Peleg, Yavne, Israel

[73] Assignee: National Semiconductor Corporation, Santa Clara, Calif.

[21] Appl. No.: 642,928

[22] Filed: Jan. 18, 1991

[51] Int. Cl.$^5$ .............................................. G09G 1/02
[52] U.S. Cl. ................... 345/189; 345/196; 345/1
[58] Field of Search ............... 340/798, 799, 723, 747, 340/717; 379/96, 98, 100; 395/164

[56] References Cited

U.S. PATENT DOCUMENTS

| | | | |
|---|---|---|---|
| 4,203,107 | 5/1980 | Lovercheck | 380/799 |
| 4,424,572 | 1/1984 | Lorig et al. | 340/798 |
| 4,485,378 | 11/1984 | Matsui et al. | 340/798 |
| 4,554,538 | 11/1985 | Bienemana | 340/799 |
| 4,644,495 | 2/1987 | Crane | 340/799 |
| 4,812,998 | 3/1989 | Maeda | 340/723 |
| 4,868,863 | 9/1989 | Hartley et al. | 379/98 |
| 5,060,257 | 10/1991 | Penalver | 379/96 |
| 5,063,587 | 11/1991 | Semasa et al. | 379/96 |
| 5,065,425 | 11/1991 | Lecomte et al. | 379/96 |
| 5,083,119 | 1/1992 | Trevett et al. | 340/734 |

Primary Examiner—Ulysses Weldon
Assistant Examiner—Doon Yue Chow
Attorney, Agent, or Firm—Limbach & Limbach

[57] ABSTRACT

A multi-mode home terminal system utilizes a single embedded processor and a single RAM for performing modem operations, graphics/video processing and general purpose control tasks. The multi-mode home terminal system supports a wide range of video/graphics standards, modems and voice algorithms. Home terminal input data to be displayed on an associated monitor can be decoded to any display list format or directly to the system's frame buffer. The display lists, frame buffer, font area, and embedded processor memory are located in the same single random access memory, thus allowing the use of a single RAM for DSP data, display lists, video buffers, voice compression/decompression algorithms and embedded controller tasks. The system is flexible for programming the desired video standard, modem type and display list format. Since both the video function and the embedded processor are supported by the same RAM, a RAM arbiter resolves bus contention.

20 Claims, 5 Drawing Sheets

MULTI-MODE HOME TERMINAL SYSTEM THAT UTILIZES A SINGLE EMBEDDED GENERAL PURPOSE/DSP PROCESSOR AND A SINGLE RANDOM ACCESS MEMORY

BACKGROUND OF THE INVENTION

1. Field of the Invention

The present invention relates generally to data processing systems and, in particular, to a processing system for home terminals that utilizes a single embedded processor and a single random access memory (RAM) for performing not only video/graphics tasks for a wide range of video/graphics standards and modes, but also all functions and controls for a variety of modem, voice algorithm and general purposes operations.

2. Discussion of the Prior Art

A home terminal is a data processing system that is capable of receiving video/graphics data, e.g., text or pictures, from a communications medium, e.g., the telephone lines, processing the received information, and presenting the data in video/graphic form on an output device such as a display monitor or a printer. A home terminal is also capable of sending such data over the communication line to complete the communication link between the home terminal and another system at the other end of the line.

Conventional home terminal systems are typically character generator systems that are based on a combination of dedicated modules: a dedicated modem function that is permanently programmed to receive/transmit only a limited number of modulated signal types, a dedicated video/graphics function that is capable of accommodating only a limited number of video/graphics standards and/or modes, and a general purpose processor or microcontroller that is dedicated to system operation. Furthermore, the general purpose processor and the video/graphics function of these conventional dedicated home terminal architectures each utilize physically separate memory space, thereby increasing operational overhead.

For example, the TS9347 CRT Controller manufactured by SGS Thomson is a character generator video processor that requires a dedicated external RAM for the video functions and a different physical memory space for a separate embedded processor chip. The TS9347 device is also dedicated to a specific terminal type. That is, both the video and processor functions require separate hardware elements which are limited to particular video modes. For example, the TS9347 device cannot be utilized in a BTX system of the type used in Germany or in NAPLPS home terminal implementations in the United States.

Figure 1:
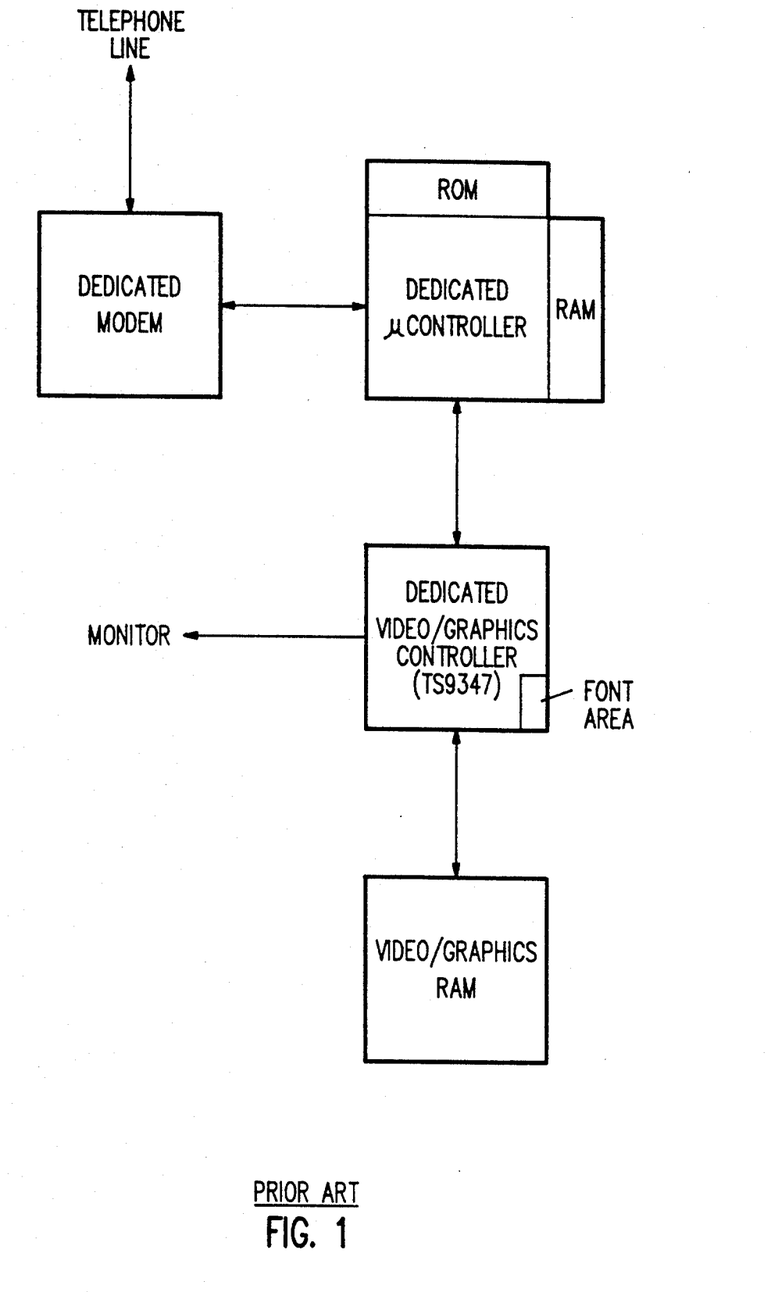
FIG. 1 is a block diagram illustrating a conventional home terminal system.

The general architecture of a home terminal system that utilizes the TS9347 device, shown in FIG. 1, includes a dedicated modem chip that recovers incoming video/graphics data from the telephone line. A dedicated microcontroller processes the recovered data utilizing code retrieved from an associated read only memory (ROM) to build a corresponding display list which is stored in an associated microcontroller RAM. A dedicated TS9347 controller receives the display list from the microcontroller and utilizes an internal character generator table to generate video output data to an associated monitor.

As stated above, in addition to the limited applications provided by conventional home terminal architectures, because of the need for separate memory space for each of the processing functions, these devices require larger die area and exhibit high system overhead.

Thus, it would be highly desirable to have available a flexible home terminal system that supports a wide range of video standards (e.g., Teletel, Prestel, Ascii, BTX and NAPLPS) and modes (e.g., internal or external color look up tables), a wide range of modems (e.g., V.21, V.22, V.22bis, Bel1212, Bel1103, V.23, V27ter and V29), and includes flexible voice compression/decompression capability.

SUMMARY OF THE INVENTION

The present invention provides a multi-mode home terminal system that utilizes a single embedded processor for performing modem operations, graphics/video processing and general purpose control tasks. The multi-mode home terminal system supports a wide range of video/graphics standards modems and voice compression/decompression algorithms. Home terminal input data to be displayed on an associated monitor can be decoded to any display list format or directly to the system's frame buffers. The display lists, frame buffer, font area, voice data and embedded processor memory are located in the same single random access memory, thus reducing system overhead by allowing the use of a single RAM for DSP data, display lists, video frame buffers and embedded controller tasks. The system is flexible for programming the desired video standard, modem type, voice compression/decompression algorithms and display list format. Since both the video function and the embedded processor are supported by the same RAM, a RAM arbiter resolves bus contention.

A better understanding of the features and advantages of the present invention may be obtained by reference to the following detailed description of the invention and accompanying drawings which set forth an illustrative embodiment in which the principles of the invention are utilized.

DETAILED DESCRIPTION OF THE EMBODIMENT

Figure 2:
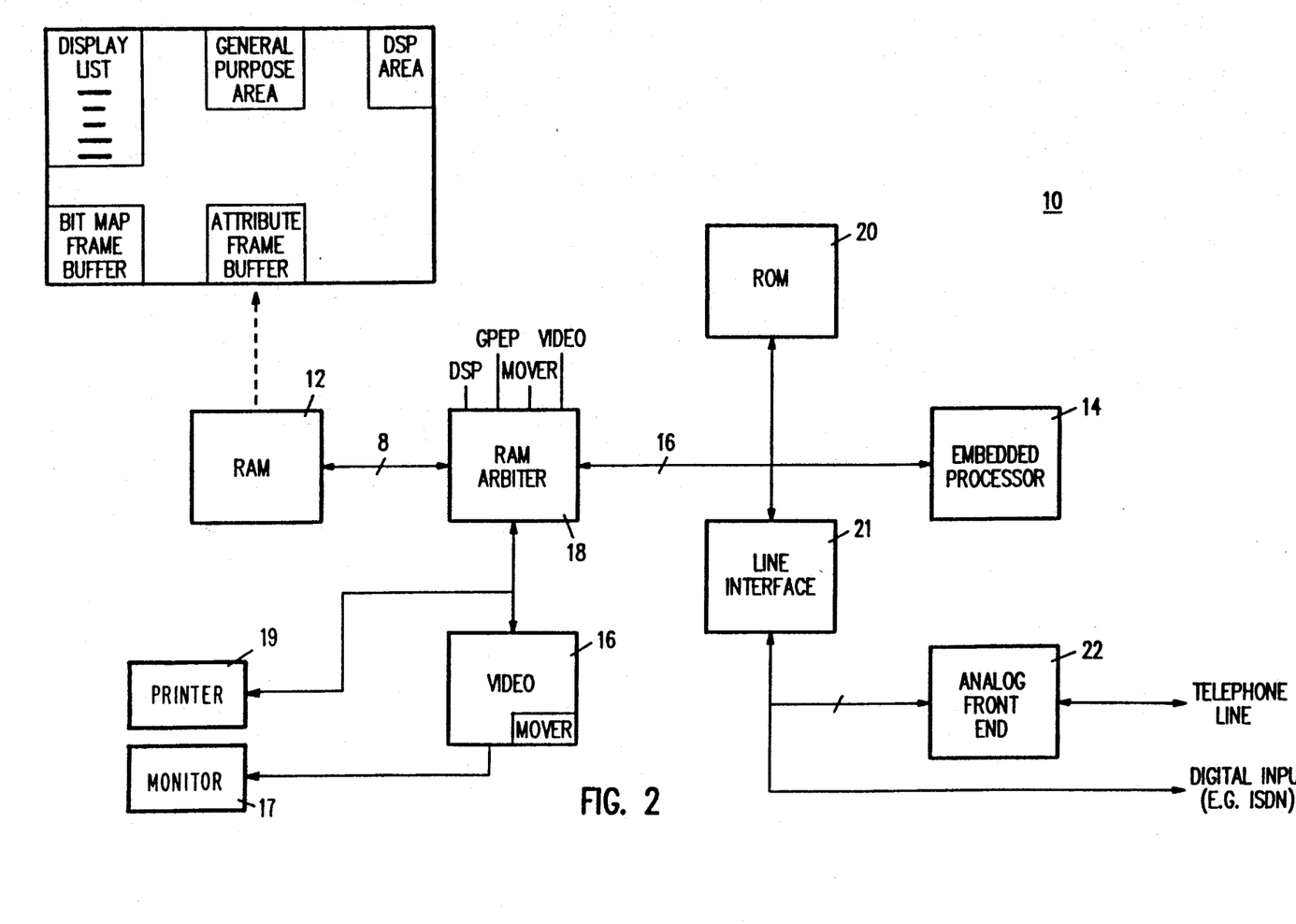
FIG. 2 is a block diagram illustrating a multi-mode home terminal system in accordance with the present invention.

FIG. 2 shows a multi-mode home terminal system 10 having a unique architecture that enables it to support a wide variety of video/graphics standards and modes and a variety of modem formats and voice compression/decompression algorithms.

The home terminal system 10 includes a single random access memory (RAM) array 12 that supports both an embedded processor 14 and a video function 16. A RAM arbiter 18 resolves contention for the RAM array 12, which, in accordance with an aspect of the present invention, supports the entire home terminal system 10 by storing/loading embedded controller tasks, DSP data, display lists, video/graphics bit map and attribute frame buffers and character font sets. The RAM array 12 may comprise any one of a number of RAM types, e.g DRAM, SRAM, VRAM.

A read only memory (ROM) 20 stores the code and data constants (e.g. operands and fixed fonts) that are needed by the embedded processor 14 for performing DSP and general purpose operations. An analog front end 22 converts a modulated input signal received on an analog communications channel, e.g. a telephone line, to a corresponding digital input signal. An example of a device suitable for use as analog front end 22 is the NS32FX210 AFE available from National Semiconductor Corporation. An analog front end (AFE) interface 21 provides serial-to-parallel conversion for signals received by the interface 21 from the analog front end 22 and parallel-to-serial conversion for signals provided to the analog font end 22.

The embedded processor 14, a preferred embodiment of which will be described below, includes both modem and general purpose processor functionality.

The programmable video function 16 generates signals that can be used for a simple black/white or for a color monitor. As described in greater detail below, the video function 16 combines a fetch machine, first-in-first-out (FIFO) memory for bit map data, dual line buffers for attributes data and a video mix processor.

The video function 16 fetches data from the two frame buffers, i.e. the bit map frame buffer and the attribute frame buffer, located in the RAM 12. The video mix processor processes the data retrieved from the bit map frame buffer according to the contents of the attribute frame buffer. The video mix processor output is sent to the monitor 27 as the R, G, B component of the monitor. Since, as stated above, the same single RAM 12 is used for all functions, the video function 16 includes an internal FIFO as a buffer between the RAM 12 and a video out shift register to allow the RAM 12 to be free of accesses by the video function 16 for monitor servicing during intensive DSP (modem) function execution by the embedded processor 14.

The video function 16 is controlled by the embedded processor 14 to generate different selected monitor screen types. The programmability of the video function 16 provides full flexibility for screen width, height, frequency rate and attribute types.

The video function 16 includes a mover module that, under the control of the embedded processor 14, provides direct memory access between the video function 16 and RAM 12 when neither the embedded processor 14 nor the video function's fetch machine require the RAM bus. The mover reads data from the character font sets stored in the RAM 12 and writes data to the bit map frame buffer in RAM 12. The mover can be used for filling the attributes frame buffer and for scrolling.

As stated above, the RAM arbiter 18 controls and prioritizes accesses to the shared RAM 12. Thus, as shown in FIG. 2, a VIDEO control input to RAM arbiter 18 from the video function 16 results, for example, in a read access to the bit map and attributes frame buffers by the video function's fetch machine. A MOVER request from the video function 16 updates the frame buffer from the display list under control of the general purpose embedded processor (GPEP) 14. A general purpose GPEP request from the embedded processor 14 to the RAM arbiter 18 allows the embedded processor to generate a display list based on the received data, convert the display list to corresponding bit map and attributes frame buffers and perform general purpose accesses. A DSP request by the embedded processor 14 provides for an access to the DSP area of RAM 12.

The embedded processor bus access utilizes four clock cycles referred to as T1, T2, T3 and T4. The embedded processor bus access can be expanded by controlling the introduction of WAIT states between the T2 and T3 cycles.

During the T1 cycle, the embedded processor 14 issues an address that identifies the current embedded processor access (e.g. internal operand, external operand or instruction fetch; operand read/write; etc.).

The RAM arbiter 18 monitors the address references issued by the embedded processor 14 to identify when the embedded processor 14 seeks access to the RAM 12. Whenever there is no conflict with the embedded processor 14, the video function 16 uses the RAM bus for its own purposes and, therefore, "hides" many bus cycles of its own RAM bus usage.

The embedded processor 14 can execute instruction fetch cycles to the ROM 20 while the RAM bus is in use by the video function 16. This allows the embedded processor 14 to keep its instruction queue filled without interfering with the mover and video fetch machine. As stated above, the RAM arbiter 18 can identify the appropriate RAM bus cycles within which to execute video function accesses to RAM 12.

Figure 3:
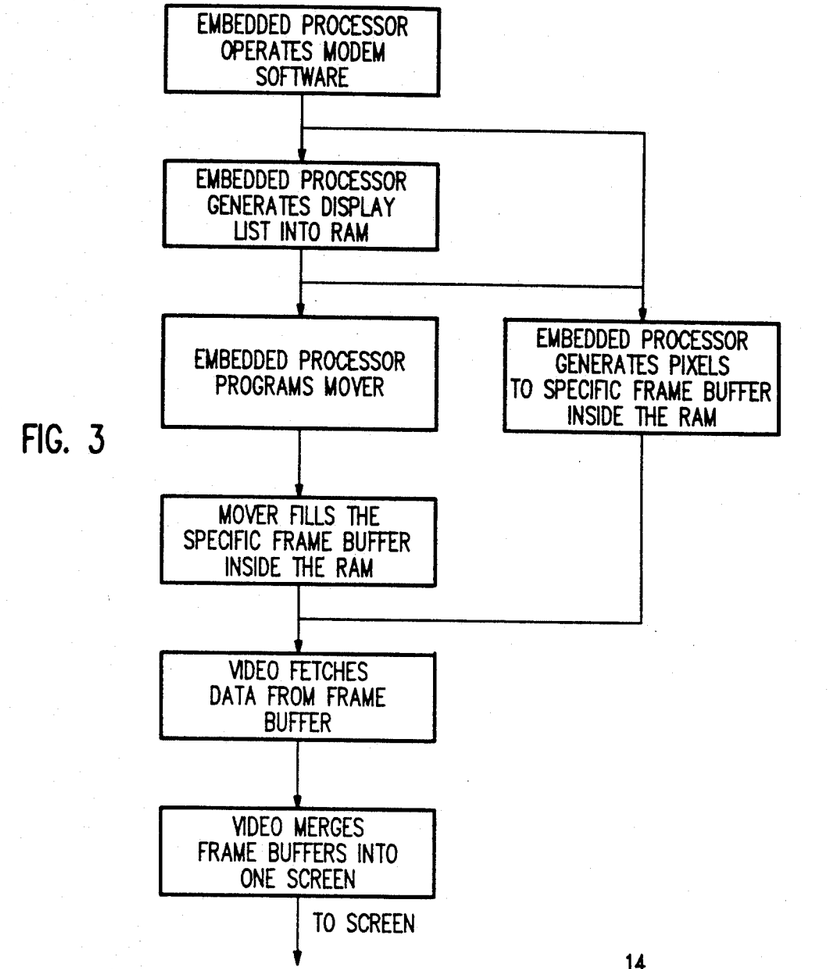
FIG. 3 is a flow chart illustrating data flow in a multi-mode home terminal system in accordance with the present invention.

FIG. 3 shows the data flow within the home terminal system 10. As shown in FIG. 3, the embedded processor 14 processes the code for the modem function. Thus, the digital data coming from the telephone line via the conventional analog front end 22 (e.g. NSC NS32FX210 AFE) is decoded either directly to the frame buffer or, alternatively, to a desired display list format. The filling of the frame buffer from the display list can be done with general purpose operations or, alternatively, with the two dimensional mover concurrently with the embedded processor operation.

The video function 16 continuously updates the screen with the current content of the frame buffer. In accordance with an aspect of the present invention, both VIDEO and MOVER transactions via the RAM arbiter 18 are usually hidden to the accesses of the embedded processor 14. This technique overcomes the bottleneck of embedded processor performance and RAM bus utilization.

The video function 16 uses dynamic FIFO zones: one for truly hidden access and one for normal cycle stealing. This meets the desired balance needed between screen rate and RAM bus utilization. In accordance with a further aspect of the present , invention, the video function 16 includes dual row buffer storage for attributes data to minimize the accesses by the video function 16 to the RAM 12, since each attribute is the same for all lines of a single character.

Figure 4:
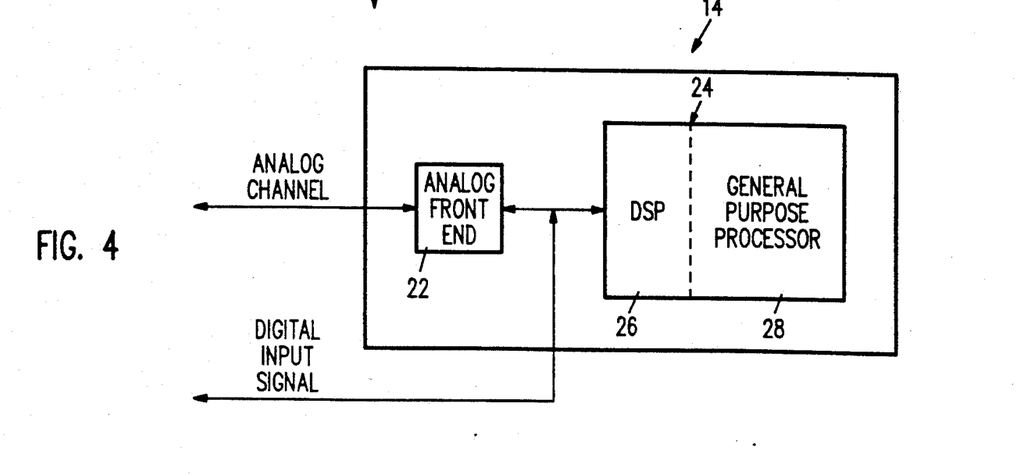
FIG. 4 is a block diagram illustrating an embedded processor architecture utilizable in a multi-mode home terminal system in accordance with the present invention.

FIG. 4 shows a preferred embodiment of embedded processor 14 that utilizes a partitioned architecture. The embedded processor 14 is described in the context of the requirements of a modem system. However, it will be understood by those skilled in the art that the principles of embedded processor 14 are applicable to any system which receives an incoming data signal that requires digital signal processing, including video/-graphics and voice data inputs.

The embedded processor 14 shown in FIG. 4 combines the functions of the analog front end 22 and an integrated processing platform 24. The integrated processing platform 24 includes both a digital signal processor (DSP) module 26 and a general purpose processor (GPP) 28.

As stated above, the analog front end 22 converts a modulated input signal received from an analog transmission channel, e.g. a telephone line, to a digitized replica of the modulated input signal. Similarly, the analog front end 22 is capable of converting an outgoing digital signal to a corresponding analog signal for transmission on the channel. The received/transmitted data may be video/graphics data or, for example, voice data. The analog front end 22 can be implemented utilizing conventional integrated circuit designs available for this purpose.

As stated above, the integrated processor platform 24 includes a DSP module 26 that recovers digital data from the digital signal generated by the analog front end 22. The DSP module 26 includes a processing mechanism that conditions the digital signal utilizing an algorithm comprising a selected sequence of DSP operations.

The general purpose processor 28 controls the DSP module 26 and processes the digital data generated by the DSP module 26 to a desired end result. For example, if video/graphics data is being received by the home terminal system 10, then the general purpose processor may convert the data to a corresponding display list which is stored in the RAM 12.

As further shown in FIG. 4, while in many applications, the analog front end 22 will be utilized to convert a modulated input signal received on an analog channel to a corresponding digital signal, there are a growing number of applications (e.g., ISDN and T1) in which a digital input signal will be received by the integrated processor platform 24 directly from a digital source.

Figure 5:
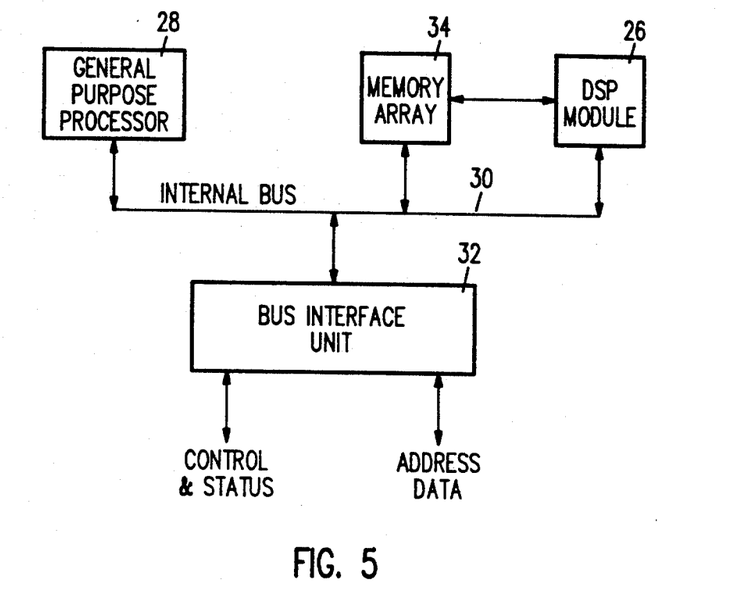
FIG. 5 is a block diagram illustrating an integrated processing platform utilizable in the FIG. 4 embedded processor architecture.

Referring to FIG. 5, both the DSP module 26 and the general purpose processor 28 are connected to an internal bus 30, allowing both the DSP module 26 and the general purpose processor 28 to communicate with the RAM 12 and ROM 20 via a conventional bus interface unit 32 for transfer of control/status information and addresses/data therebetween. It will be understood by those skilled in the art that the internal bus 30 comprises both an internal address bus for handling address references by the DSP module 26 and the general purpose processor 28 and an internal data bus for handling instruction and data transfers.

To save bus bandwidth, the DSP module 26 stores operands used in executing DSP algorithms in an internal RAM memory array 34 which is also accessible to general purpose processor 28. That is, the internal memory array 34 serves as a shared resource for both the DSP module 26 and the general purpose processor 28. In the illustrated embodiment, the internal memory 34 is shown as accessible by both the DSP module 26 and the general purpose processor 28 via the internal bus 30. It will be understood by those skilled in the art that other bus structures would also provide the desired shared accessibility to the internal memory array 34; for example, the internal memory array 34 could be implemented as a dual port memory.

The DSP module 26 may fetch operands in parallel from the internal memory array 34 and the system memory, i.e. RAM 12.

The DSP module 26 executes vector operations on complex variables that are optimized for DSP applications. The general purpose processor 28 treats the DSP module 26 as a memory mapped I/O device that occupies a reserved memory space, interfacing with the DSP module 26 via a set of memory mapped registers.

Figure 6:
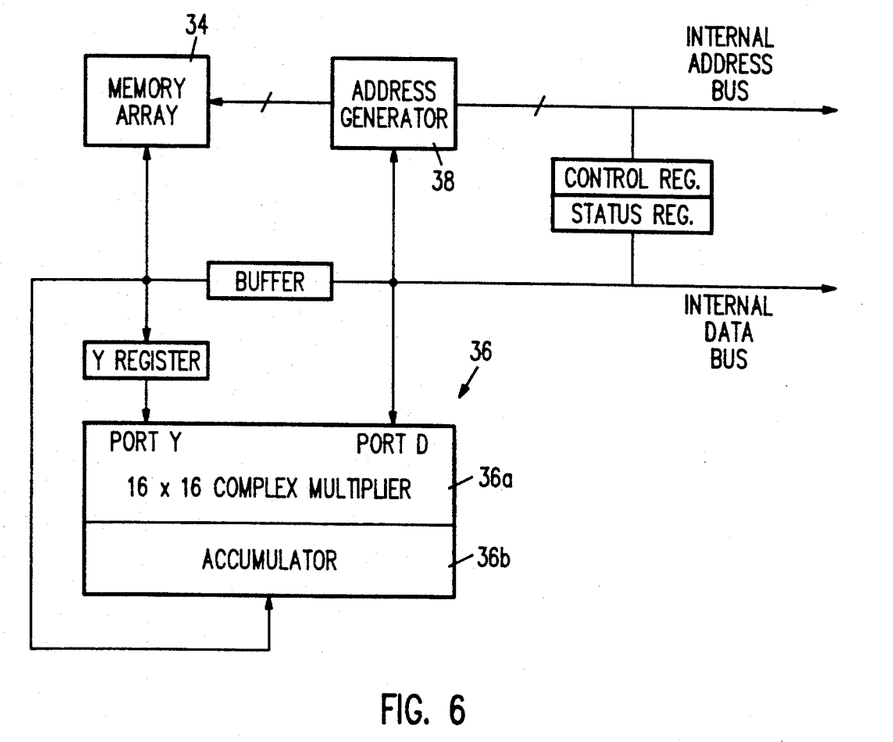
FIG. 6 is a block diagram illustrating the FIG. 5 integrated processing platform in greater detail.

As shown in FIG. 6, high performance is achieved in the DSP module 26 by using the internal shared memory array 34 as well as a multiplier/accumulator 36. The DSP module 26 also includes its own internal address generator 38 for system memory 12 and for internal operand accesses to memory array 34, thus reducing the load on the general purpose processor 28. Both the multiplier/accumulator 36 and the address generator 38 are conventional implementations.

In the operation of the embedded processor 14, the general purpose processor 28 selects from a basic set of DSP operations to define a specific sequence of operations as the DSP algorithm to be executed by the DSP module 26 for recovering data from the incoming digital signal. The general purpose processor 28 then accesses RAM 12 to retrieve operands required for execution of the selected DSP algorithm and/or instructions and data critical to the general purpose processor 28 for controlling the DSP module 26 or for performing general purpose tasks and loads them into the internal RAM array 34. The general purpose processor 28 then invokes the first DSP operation in the selected sequence by issuing the corresponding command to the control register of the DSP module 26. The DSP module 26 then places the general purpose processor 28 in a continuous WAIT state while it performs the first DSP operation utilizing operands retrieved by the address generator 38 from the internal array 34 and system memory 12. Upon completion of the DSP operation, the DSP module 26 cancels the continuous WAIT state and the general purpose processor 28 then either reads the status of the DSP module 26 or the result of the DSP operation or carriers on with the execution of its normal program flow, which may be either invoking the next DSP operation in the selected sequence by issuing the appropriate command to the DSP module control register or performance of a general purpose task. This process continues until the selected sequence of DSP operations has been completed. The general purpose processor may then download the contents of the shared internal RAM array 34 and retrieve a new set of operands, instructions and data for further DSP operations or general purpose processing tasks.

Additional information relating to the above-described preferred embodiment of embedded processor 14 may be obtained by reference to co-pending and commonly-assigned U.S. patent application Ser. No. 467,148, filed Jan. 18, 1990, by Intrater et al, which application is hereby incorporated by reference.

An example of the above-described preferred embodiment of embedded processor 14 is the NS32FX16 High Performance Fax Processor, available from National Semiconductor Corporation.

Figure 7:
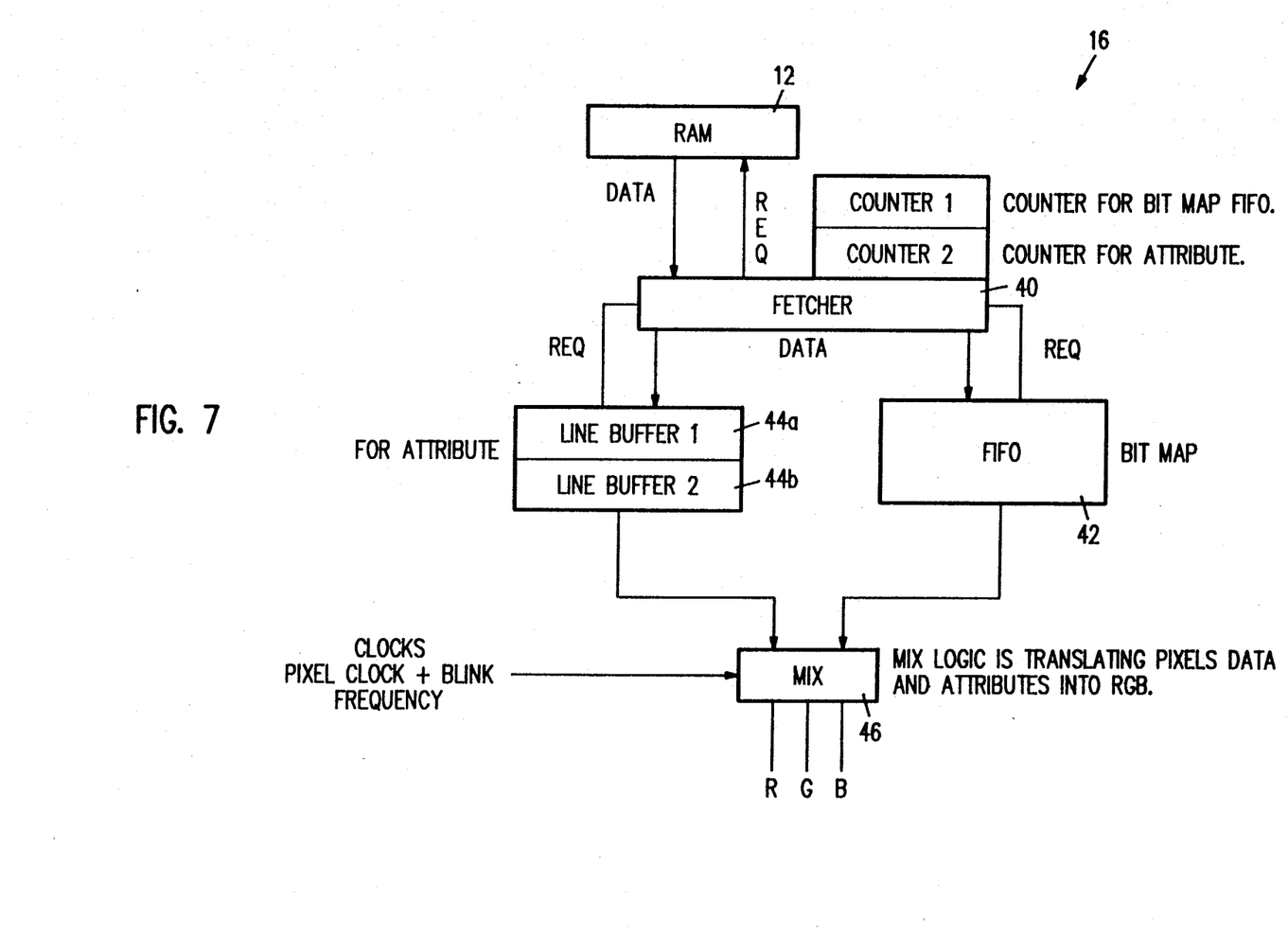
FIG. 7 is a block diagram illustrating a video function utilizable in a multi-mode home terminal system in accordance with the present invention.

FIG. 7 shows the video function 16 of the home terminal system 10 in greater detail. As stated above, the video function 16 is a combination of a fetch machine 40, a FIFO 42 for storing bit map data, a pair of row buffers 44a and 44b for storing attributes data and a mix video processor 46.

As stated above, the video function 16 fetches data from the two frame buffers, i.e. the bit map frame buffer and the attributes frame buffer, located in the RAM 12. The mix video processor 46 processes the bit map frame buffer data stored in FIFO 42 according to the attribute frame buffer data stored in the line buffers 44a, 44b. The output of the mix processor 46 is sent to the monitor as R, G, B screen components.

Both the fetch machine and the mover can issue VIDEO access requests to the RAM 12. If both functions issue a VIDEO access request simultaneously, then a configuration bit set by the embedded processor 14 determines priority. In general, if the access is to a shorter area of RAM 12, then the mover has priority. If the access is to a larger area of RAM 12, then the fetch machine has priority. If the bit map FIFO 42 below its threshold level, then priority changes and the access also has priority over access to the RAM 12 by embedded processor 14.

As stated above, the video block 16 is controlled by the embedded processor 14 to generate different screen types, the programming of the video being a simple flexible mechanism for determining screen width, height, frequency rate and attribute types.

The fetcher 40 fetches frame buffer data from the RAM 12 for the two attributes row buffers 44a, 44b or for the bit map FIFO 42 according to the priority assigned to the RAM arbiter 18. As shown in FIG. 7, the fetcher 40 includes two counters, one for the attribute row buffers and one for the bit map FIFO 42. The row buffers 44a, 44b are filled from the attribute frame buffer inside the RAM 12 according to the value of counter1. The bit map FIFO 42 is filled from the bit map frame buffer inside the RAM 12 according to the value of counter2.

Since two row buffers 44a, 44b are provided for attributes data, when there is a cross in character rows, the buffers are switched. One buffer is for displaying the attributes and the other is for filling them. Priority logic inside the fetcher 40 ensures that, at the end of a character line, the next buffer is filled. Every attribute will be fetched once per screen and used for x pixels (x is the character width) and in y lines (y is the character height).

The bit map FIFO 42 always requests the next data. The size of the FIFO 42 is programmable to meet the balance between performance and bus utilization for each different screen mode. The FIFO 42 has low priority generally, but its priority increases when its threshold is higher than the number of bytes inside the FIFO 42. Every pixel data is fetched once per display screen.

The mix video processor 46 translates pixel bit map data and attributes into R, G and B components. The bit map data is affected by the corresponding attribute in the line buffer. The attributes relate, for example, to blink, foreground color, background color, inverse, etc.

As shown in FIG. 7, the clocks to the mix video processor 46 come from the screen mode definition which can be programmed by the embedded processor 14.

It should be understood that various alternatives to the embodiments of the invention described herein may be employed in practicing the invention. It is intended that the following claims define the scope of the invention and that the structure and methods within the scope of these claims and their equivalents be covered thereby.

What is claimed is:

1. An integrated multi-mode home terminal system for recovering video/graphics information from digital input sample signals sampled from a modulated analog video/graphics input signal received by the home terminal system from an analog communications medium and for processing the video/graphics information for display on an associated monitor, the integrated multi-mode home terminal system comprising:

an analog front end for receiving the modulated analog video/graphics input signal from the analog communications medium and for converting the modulated analog video/graphics input signal to a corresponding serial digital input sample signal;

line interface means for converting the serial digital input sample signal to a parallel digital input sample signal;

a single embedded processor that is connected to receive the parallel digital input sample signal from the line interface means and that performs both digital signal processing operations to recover video/graphics digital data from the parallel digital input sample signal and general purpose processing operations to convert the video/graphics digital data to mix video data that includes bit map frame buffer data and corresponding attributes frame buffer data;

transfer means for storing the bit map frame buffer data and the corresponding attributes frame buffer data generated by the single embedded processor in a single shared RAM array;

a video processor that processes the bit map frame buffer data and the corresponding attributes frame buffer data to generate display data that is provided to the associated monitor for display thereby;

a single shared RAM array for storing digital signal processor (DSP) data that is utilizable by the single embedded processor for performing the digital signal processing operations general purpose digital data that is utilizable by the single embedded processor for performing the general purpose processing operations, and the bit map frame buffer data and corresponding attributes frame buffer data generated by the single embedded processor;

a single access data bus that connects both the single embedded processor and the video processor to the single shared RAM array via a common output port of the single shared RAM array; and a RAM arbiter connected to the single access data bus and responsive to access addresses issued by the single embedded processor for arbitrating simultaneous access requests to the single shared RAM array by the embedded processor and the video processor via the single access data bus.

2. An integrated multi-mode home terminal system as in claim 1 and wherein the video processor comprises:

a fetch machine for retrieving the bit map frame buffer data and the corresponding attributes frame buffer data from the single shared RAM array;

a bit map first-in-first-out (FIFO) memory element for storing the bit map frame buffer data retrieved by the fetch machine;

row buffer storage means for storing the corresponding attributes frame buffer data retrieved by the fetch machinery such that the bit map frame buffer data and the corresponding attributes frame buffer data are synchronized; and mix video processor means for processing the bit map frame buffer data stored in the bit map frame buffer FIFO memory element and the corresponding attributes frame buffer data stored in the row buffer storage means to generate R,G,B screen component display data that is provided tot he associated monitor for display thereby.

3. A method of processing a video/graphics input signal received from a communication medium for display by an associated output device, the method comprising:

converting the video/graphics input signal received from the communications medium to a corresponding parallel digital input sample signal;

utilizing a single embedded processor both for processing the parallel digital input sample signal utilizing digital signal processing operations to recover video/graphics digital data therefrom and for processing the video/graphics digital data utilizing general purpose processing operations to generate bit map frame buffer data and corresponding attributes frame buffer data therefrom;

storing the bit map frame buffer data and the corresponding attributes frame buffer data in a single shared RAM array that also stores digital signal processor (DSP) data utilizable by the single embedded processor for performing the digital signal processing operations and general purpose digital data utilizable by the single embedded processor for performing the general purpose operations;

retrieving the bit map frame buffer data and the corresponding attributes frame buffer data from the single shared RAM array via a single access data bus that is also utilizable for retrieval of the DSP data and the general purpose digital data by the single embedded processor;

utilizing a video processor connected to the single access data bus for processing the bit map frame buffer data and the corresponding attributes frame buffer data retrieved from the single shared RAM array to generate display data; and providing the display data to the associate output device.

4. A method as in claim 3 wherein the video/graphics input signal is a digital signal received from a digital network via the communications medium.

5. A method of processing an analog video/graphics input signal received from an analog communication medium for display by an associated monitor, the method comprising:

converting the analog video/graphics input signal received from the analog communications medium to a corresponding serial digital input sample signal;

converting the serial digital input sample signal to a corresponding parallel digital input sample signal;

utilizing a single embedded processor both for processing the parallel digital input sample signal utilizing digital signal processing operations to recover video/graphics digital data therefrom and for processing the video/graphics digital data therefrom and for processing the video/graphics digital data utilizing general purpose processing operations to generate corresponding display list data;

storing the display list data in a single shared RAM array that also stores digital signal processor (DSP) data utilizable by the single embedded processor for performing the digital signal processing operations and general purpose digital data utilizable by the single embedded processor for performing the general purpose operations;

retrieving the display list data from the single shared RAM array via a single access data buss that is also utilizable by the single embedded processor for retrieval of the DSP data and the general purpose digital by the single embedded processor and processing the display list data utilizing the single embedded processor to generate bit map frame buffer data and corresponding attributes frame buffer data;

storing the bit map frame buffer data and corresponding attributes frame buffer data in the single shared RAM array via the single access data bus;

retrieving the bit map frame buffer data and corresponding attributes frame buffer data from the single shared RAM array via the single access data bus and utilizing a video processor connected to the single access data bus for processing the bit map frame buffer data and corresponding attributes frame buffer data to generate R,G,B screen components display data; and providing the R,G,B screen components display data tot he associated monitor for display thereby.

6. An integrated multi-mode home terminal system that recovers video/graphics digital data from a digital input sample signal, converts the video/graphics digital data to corresponding mix video data and processes the mix video data to generate display data for display by an associated output device, the integrated multi-mode home terminal system comprising:

a single embedded processor that performs both digital signal processing operations to recover the video/graphics digital data from the digital input sample signal and general purpose processing operations to convert the video/graphics digital data to mix video data that includes both bit map frame buffer data and corresponding attributes frame buffer data;

a video processor that processes the bit map frame buffer data and the corresponding attributes frame buffer data to generate display data that is provided to the output device for display thereby;

a single shared RAM array for storing digital signal processor (DSP) data that is utilizable by the single embedded processor for performing the digital signal processing operations, general purpose digital data that is utilizable by the single embedded processor for performing the general purpose processing operations, and the bit map frame buffer data and the corresponding processor, the single shared RAM array being connected both to the single embedded processor and to the video attributes frame buffer data processed by the video processor via a single access data bus such that both the single embedded processor and the video processor access the single shared RAM array via a common output port of the single shared RAM array; and a RAM arbiter that is connected to the single access data bus and that responds to access addresses issued by the single embedded processor by arbitrating simultaneous requests by the single embedded processor and the video processor for access to the single shared RAM array.

7. An integrated multi-mode home terminal system as in claim 6 wherein the output device comprises a display monitor.

8. An integrated multi-mode home terminal system as in claim 6 wherein the output device comprises a printer.

9. An integrated multi-mode home terminal system as in claim 6 wherein the single shared RAM array is a single dynamic random access memory (DRAM) storage element.

10. An integrated multi-mode home terminal system as in claim 9 wherein the DRAM storage element is a video random access memory (VRAM).

11. An integrated multi-mode home terminal system as in claim 6 wherein the single shared RAM array is a single static random access memory (SRAM) storage element.

12. An integrated multi-mode home terminal system as in claim 6 wherein the video processor further comprises:
   a fetch machine for retrieving the bit map frame buffer data and the corresponding attributes frame buffer data from the single shared RAM array;
   a bit map first-in-first-out (FIFO) memory element for storing the bit map frame buffer data retrieved by the fetch machine;
   row buffer storage means for storing the corresponding attributes frame buffer data retrieved by the fetch machine such that the bit map frame buffer data and the corresponding attributes frame buffer data are synchronized; and
   mix video processor means for processing the bit map frame buffer data stored in the bit map FIFO memory element and the corresponding attributes frame buffer data stored in the row buffer storage means to generate the display data that is provided to the output device.

13. An integrated multi-mode home terminal system as in claim 12 wherein the output device comprises a display monitor and the display data comprises R,G,B screen component data.

14. An integrated multi-mode home terminal system as in claim 10 wherein the row buffer storage means comprises a first row buffer storage element for receiving new attributes frame buffer data retrieved by the fetch machine and a second row buffer storage element for storing the corresponding attributes frame buffer data such that the corresponding attributes frame buffer data is utilizable in conjunction with the currently displayed display data.

15. An integrated multi-mode home terminal system as in claim 14 wherein the fetch machine includes primary logic for switching the first and second row buffer storage elements when there is a cross in character rows.

16. An integrated multi-mode terminal system as in claim 6 and further comprising:
   a shared ROM array that is connected for access by the single embedded processor and that stores an instruction set utilizable by the single embedded processor for performing both the digital signal processing operations and the general purpose processing operations.

17. An integrated multi-mode home terminal system as in claim 16 wherein the digital input sample signal is voice sample data and the single embedded processor includes means for processing the voice sample data utilizing a digital voice processing algorithm stored in the shared ROM array.

18. An integrated multi-mode home terminal system as in claim 16 wherein the single embedded processor performs the digital signal processing operations to recover the video/graphics digital data from the digital input sample signals utilizing a digital signal processing algorithm stored in the shared ROM array.

19. An integrated multi-mode home terminal system as in claim 6 wherein the video processor includes mover means for retrieving the bit map frame buffer data and the corresponding attributes frame buffer data from the single shared RAM array and for storing the bit map frame buffer data and the corresponding attributes frame buffer data in the single shared RAM array.

20. An integrated multi-mode home terminal system as in claim 6 wherein the single embedded processor includes access means for storing the bit map frame buffer data and the corresponding attributes frame buffer data generated by the single embedded processor in the single shared RAM array.

* * * * *

UNITED STATES PATENT AND TRADEMARK OFFICE
CERTIFICATE OF CORRECTION

PATENT NO. : 5,250,940

DATED : OCTOBER 5, 1993

INVENTOR(S): Maurice Valentaten et al.

It is certified that error appears in the above - identified patent and that said Letters Patent is hereby corrected as shown below:

IN THE CLAIMS:

In Col. 8, line 42, after "operations" insert --,--.

In Col. 9, line 8, delete "tot he" and replace with --to the--.

In Col. 10, line 9, delete "buss" and replace with --bus--.

In Col. 10, line 29, delete "tot he" and replace with --to the--.

In Col. 10, line 56, after "corresponding" insert --attributes frame buffer data processed by the video--.

UNITED STATES PATENT AND TRADEMARK OFFICE
CERTIFICATE OF CORRECTION

PATENT NO. : 5,250,940

DATED : October 5, 1993

INVENTOR(S) : Maurice Valentaten et al.

It is certified that error appears in the above-indentified patent and that said Letters Patent is hereby corrected as shown below:

In Col. 10, lines 58 and 59, delete "attributes frame buffer data processed by the video".

Signed and Sealed this

Twenty-ninth Day of March, 1994

Attest:

BRUCE LEHMAN

Attesting Officer

Commissioner of Patents and Trademarks